No. 623,040. Patented Apr. 11, 1899.
M. C. SATHER.
LAWN MOWER.
(Application filed Apr. 30, 1898.)
(No Model.)
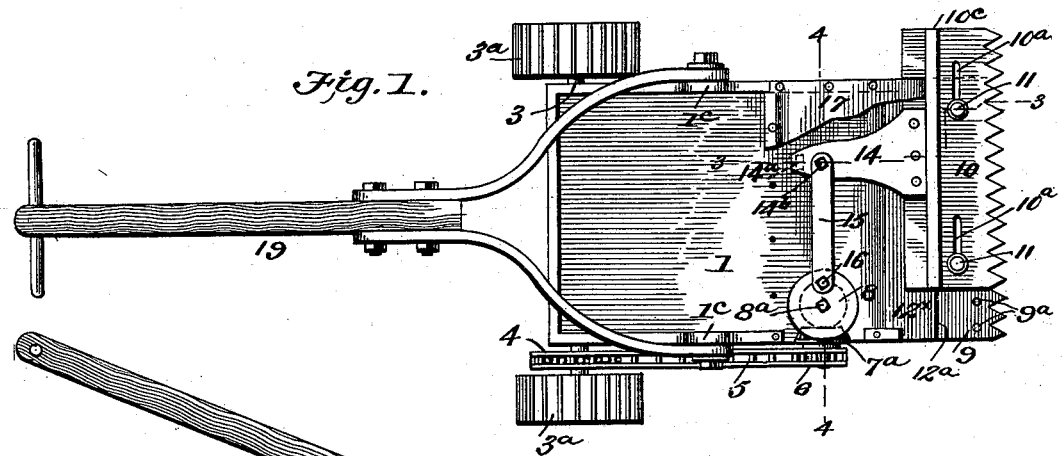
Fig. 1.
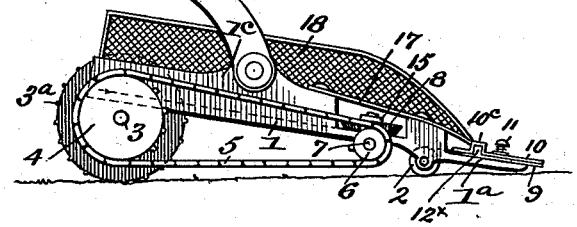
Fig. 2.
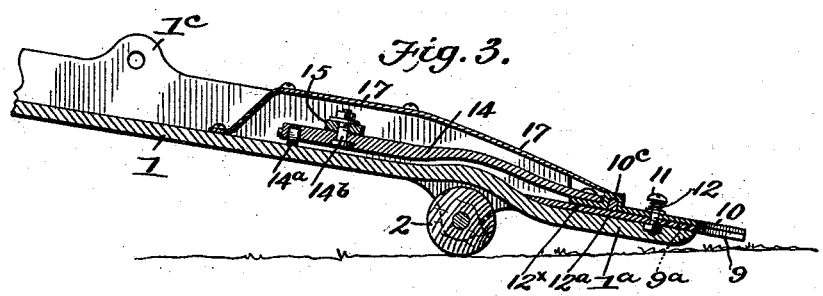
Fig. 3.
Fig. 4.
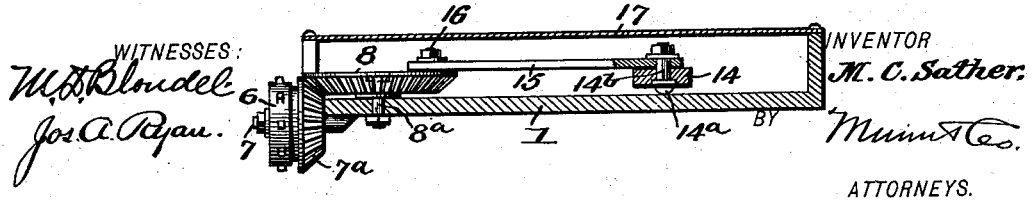
WITNESSES:
M. D. Blondel.
Jos. A. Ryan.
INVENTOR
M. C. Sather.
BY
Munn & Co.
ATTORNEYS.
THE NORRIS PETERS CO., PHOTO-LITHO., WASHINGTON, D. C.

UNITED STATES PATENT OFFICE.

MARTIN CHRISTIANSON SATHER, OF MINNEAPOLIS, MINNESOTA, ASSIGNOR OF ONE-HALF TO CHARLES W. BIBB, OF SAME PLACE.

LAWN-MOWER.

SPECIFICATION forming part of Letters Patent No. 623,040, dated April 11, 1899.

Application filed April 30, 1898. Serial No. 679,358. (No model.)

*To all whom it may concern:*

Be it known that I, MARTIN CHRISTIANSON SATHER, residing at Minneapolis, in the county of Hennepin and State of Minnesota, have invented a new and Improved Lawn-Mower, of which the following is a specification.

This invention relates to improvements in that class of lawn-mowers having reciprocating cutter devices, and it primarily seeks to provide a mower of this kind of a very simple and compact nature, of very few parts, easily manipulated, and effective in use.

This invention also comprehends a novel construction of cutter-operating means whereby the cutter will be caused to operate uniformly and on irregular and uneven as well as even ground.

In its subordinate features this invention consists in the peculiar combination and novel arrangement of parts, whereby the knife-bar is held steady and in proper position irrespective of the character of the ground over which it passes and whereby the connecting means for transmitting the reciprocal action to the movable cutter-bar from the rotary drive-shaft are rendered the more stable and simple and of such nature as to effect a positive and uniform action of the said movable cutter and so arranged as to be readily adjusted or repaired when necessary.

In the drawings, Figure 1 is a plan view of my improved mower, parts being broken away. Fig. 2 is a side elevation thereof with the grass-basket in place. Fig. 3 is a longitudinal section of the cutter device, taken practically on the line 3 3 of Fig. 1. Fig. 4 is a transverse section taken on the line 4 4 of Fig. 1.

Referring to the accompanying drawings, in which like numerals indicate like parts in all the figures, 1 indicates the body or platform of my improved mower, the front end of which is supported on the transverse wooden roller 2, disposed just back of the front or cutter end, which end $1^a$ dips slightly, so as to have a close relation to the ground, as clearly shown in Figs. 2 and 3.

On the rear end of the frame 1 is mounted the drive-axle 3, which carries the large ground-wheels $3^a$, one end of which projects away from the frame 1 to provide clearance for a chain-wheel 4, fixedly mounted on the axle 3, over which the endless drive-chain 5 passes, the front end of the drive-chain passing over a similar chain-wheel 6 on the short stub-shaft 7, journaled on the frame 1, parallel to the cutter-bar, as best shown in Fig. 4.

The shaft 7 carries a beveled gear $7^a$, which meshes with the crank beveled gear 8, held horizontally over one end of the platform 1, but being mounted on the stub-shaft $8^a$, projected up from the platform or frame 1.

9 indicates a fixedly-held cutter-bar secured to the end $1^a$ of the frame 1 by countersunk screws $9^a$, and 10 designates the reciprocating cutter, provided with a plurality of elongated slots $10^a$ for the passage of the guide-studs 11, on which are held spring-bearings 12, which serve to hold the cutter 10 to travel closely over the fixed bar 9, and to further guide the said cutter 10 and effect a uniform reciprocation thereof the same is formed with an inverted longitudinal socket $10^c$, which engages the tongue $12^a$, projected vertically from a bearing-plate $12^\times$, secured to the frame 1, as clearly shown in Figs. 1 and 3.

14 indicates an arm fixedly secured to the cutter 10 and projected rearwardly therefrom, its outer end having a roller-bearing $14^a$, held to travel on the platform 1, whereby to steady such arm 14 and cause it to move freely over the said platform.

At a point near its rear end the arm 14 has a wrist-pin $14^b$, to which connects one end of the pitman-rod 15, the other end of which joins with the crank or wrist pin 16 on the large gear-wheel 8.

17 indicates a casing which covers the gear and pitman connections, 18 a grass-basket secured to the frame in any approved manner, and 19 designates the handle, the bifurcated end of which is pivotally secured to the ears $1^c$ on the sides of the frame 1 at a point between the ground-wheels and the front supporting-roller.

From the foregoing description, taken in connection with the drawings, it is thought the advantages of my improvement will readily appear. It will be apparent that as the front end rests on a single roller such end is dipped to travel close over the ground, and the drive-gear connection (chain) being a flexible one the cutters will operate to mow the grass irrespective of the irregular movement of the body of the mower as the front roller and the ground-wheels travel over uneven ground.

The several parts are so connected that by removing the inclosing casing they can be disconnected when it is desired to adjust or repair the same.

Having thus described my invention, what I claim, and desire to secure by Letters Patent, is—

The hereinbefore-described improvements in lawn-mowers, in combination; the platform; the rear axle having ground-wheels and a chain-wheel; a front supporting-roller; a fixedly-held cutter; a vertical guide fixedly held on the platform parallel with the cutters; the reciprocating cutter, having an inverted socket engaging the fixed guide; means for holding the said reciprocating cutter in touch with the fixed cutter, said reciprocating cutter having a rearwardly-extending arm provided with a guide-roll engaging the platform; the horizontal gear 8; the pitman connecting it with the aforesaid cutter-arm, and the gear $7^a$, meshing with the gear 8, all being arranged substantially as shown and described.

MARTIN CHRISTIANSON SATHER.

Witnesses:
ANTHONY T. GROTTE,
BERNARD B. BRETT.